US009571460B2

(12) United States Patent
van Ham et al.

(10) Patent No.: US 9,571,460 B2
(45) Date of Patent: *Feb. 14, 2017

(54) ADAPTIVE COMMUNICATION ANONYMIZATION

(71) Applicant: INTERNATIONAL BUSINESS MACHINES CORPORATION, Armonk, NY (US)

(72) Inventors: Franciscus Jacobus van Ham, Weert (NL); Georg Sander, Frankfurt (DE); Bruno Haible, Frankfurt am Main (DE); Stephen Joseph Neupauer, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/930,592

(22) Filed: Jun. 28, 2013

(65) Prior Publication Data

US 2014/0012916 A1   Jan. 9, 2014

(30) Foreign Application Priority Data

Jul. 5, 2012   (GB) .................................. 1211919.4

(51) Int. Cl.
*G06F 15/16* (2006.01)
*H04L 29/06* (2006.01)

(52) U.S. Cl.
CPC ......... *H04L 63/0421* (2013.01); *H04L 65/403* (2013.01)

(58) Field of Classification Search
CPC ... G06Q 10/107; H04L 51/28; H04L 63/0407; H04L 63/12; H04L 63/0421; H04L 63/08; H04L 65/403; H04M 1/575; H04W 12/02
(Continued)

(56) References Cited

U.S. PATENT DOCUMENTS 7,664,242 B2    2/2010   Finkelman et al.
2004/0015554 A1*  1/2004  Wilson ................. G06Q 10/107
                                              709/206

(Continued)

OTHER PUBLICATIONS

Chang et al, "Efficient End-to-End Authentication Protocols for Mobile Networks," IEEE, pp. 1252-1256, 1996.
(Continued)

*Primary Examiner* — Christopher Biagini
(74) *Attorney, Agent, or Firm* — Yudell Isidore PLLC

(57) ABSTRACT

A system and computer program product identifies anonymized parties in a transmitted communication. A sender replaces one or more communication party identifiers in control data within a communication with one or more anonymized identifiers before transmitting the communication to one or more recipients of the communication. A recipient receiving the communication searches a local lookup table by an anonymized identifier for a corresponding non-anonymized identifier which identifies a party of the communication. In response to identifying a corresponding non-anonymized identifier, the recipient then replaces the anonymized identifier with the corresponding communication party identifier and presents the recipient with the non-anonymized identifiers within the communication.

20 Claims, 14 Drawing Sheets

(58) Field of Classification Search
USPC .......................................................... 709/204
See application file for complete search history.

(56) References Cited

U.S. PATENT DOCUMENTS

| | | | |
|---|---|---|---|
| 2004/0143633 A1* | 7/2004 | McCarty ...................... 709/206 |
| 2005/0113076 A1 | 5/2005 | Lee |
| 2006/0026438 A1* | 2/2006 | Stern ....................... H04L 51/12 |
| | | | 713/184 |
| 2008/0084982 A1 | 4/2008 | Chatterjee |
| 2008/0235336 A1* | 9/2008 | Stern .................... G06Q 10/107 |
| | | | 709/206 |
| 2009/0131022 A1* | 5/2009 | Buckley et al. ............ 455/412.1 |
| 2010/0023585 A1* | 1/2010 | Nersu et al. .................. 709/206 |
| 2010/0046507 A1 | 2/2010 | Rosenberg et al. |
| 2010/0291909 A1* | 11/2010 | Nagaraja ....................... 455/415 |
| 2013/0067227 A1* | 3/2013 | Derrick ............... H04L 63/0421 |
| | | | 713/168 |
| 2013/0139268 A1* | 5/2013 | An ....................... G06F 21/6245 |
| | | | 726/26 |

OTHER PUBLICATIONS

Allow hidden (BCCed) email recipients who know each other to see each other, IP.com Disclosure No. IPCOM000211540D, Oct. 11, 2011.

Cheng, Bih-Tsern, Non-Final Office Action, U.S. Appl. No. 14/473,013, The United States Patent and Trademark Office, pp. 1-20.

Cheng, Bih-Tsern, Non-Final Office Action, U.S. Appl. No. 14/473,013, The United States Patent and Trademark Office, Mar. 25, 2016, pp. 1-20.

* cited by examiner

| CREATE MESSAGE WINDOW 500 | 502 | - | ☐ | X |

SEND 504

| | MESSAGE DATA 506 ||
| --- | --- | --- |
| | ADDRESS ID 510 | ANONYMIZE 512 |
| FROM 514 | A (e.g. MrA@A.com) | YES |
| TO 516 | B | NO |
| CC 518 | C, D | YES |
| BCC 520 | E | |

MESSAGE BODY 508

"This is a test message body"

*Fig. 5*

ADAPTIVE COMMUNICATION ANONYMIZATION

PRIORITY

The present application claims benefit of priority under 35 USC §120 and §365 to the previously filed United Kingdom Patent Application No. 1211919.4, titled, "Adaptive Communication Anonymization" with a priority date of Jul. 5, 2013. The content of that application is incorporated by reference herein.

BACKGROUND

The present disclosure relates in general to adaptive communication anonymization. Still more particularly, the present disclosure relates to identifying anonymized parties in a communication between parties.

The disclosure operates in the general environment of communication including: email, simple messaging system, instant messaging, voice messaging, telephony, or any other communication system that transmits source and destination identifiers with a communication.

SUMMARY

This disclosure relates to a system and computer program product for identifying anonymized parties in a transmitted communication. A sender replaces one or more communication party identifiers in control data within a communication with one or more anonymized identifiers before transmitting the communication to one or more recipients of the communication. A recipient device receiving the communication searches a local lookup table by an anonymized identifier for a corresponding non-anonymized identifier which identifies a party of the communication. In response to identifying a corresponding non-anonymized identifier, the recipient device then replaces the anonymized identifier with the corresponding communication party identifier and presents the recipient with the non-anonymized identifiers within the communication.

In a first aspect of the present disclosure the processes provided herein may be carried out in an email system wherein the initiator is a client application that replaces one or more email addresses with one or more anonymized email identifiers. The recipient is a messaging client and the messaging may be peer-to-peer or via a server. The local lookup table is an address book lookup table (or is part of one) that resides on the recipient device. The anonymized identifiers are replaced with corresponding email addresses. Although the preferred embodiment is a method in an email system, other electronic packet message systems may be used including, but not limited to, text, voice, or video.

In another embodiment the processes provided herein may be carried out in a circuit switch communication system such as a public switched telephony network where an initiator contains the calling telephone number (Calling Number Identification CNID) so that the recipient can see who is calling that can be anonymized. In telephony, a lookup using the CNID on a receiver's telephone internal address book is made to determine the name stored by the receiver. A telephony embodiment would hash the CNID and have a corresponding hash for telephone numbers stored on a recipient's phone. Caller ID (caller identification, CID), also called calling line identification (CLID), calling number delivery (CND), or calling line identification presentation (CLIP) are all similar to calling number identification (CNID) and may be anonymized to perform an embodiment.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

FIG. 5 illustrates an example graphic user interface window for a create message window according to the preferred embodiment;

DETAILED DESCRIPTION

Provided are a method, an apparatus, and a computer program product for identifying anonymized parties in a transmitted communication. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Figure 1:
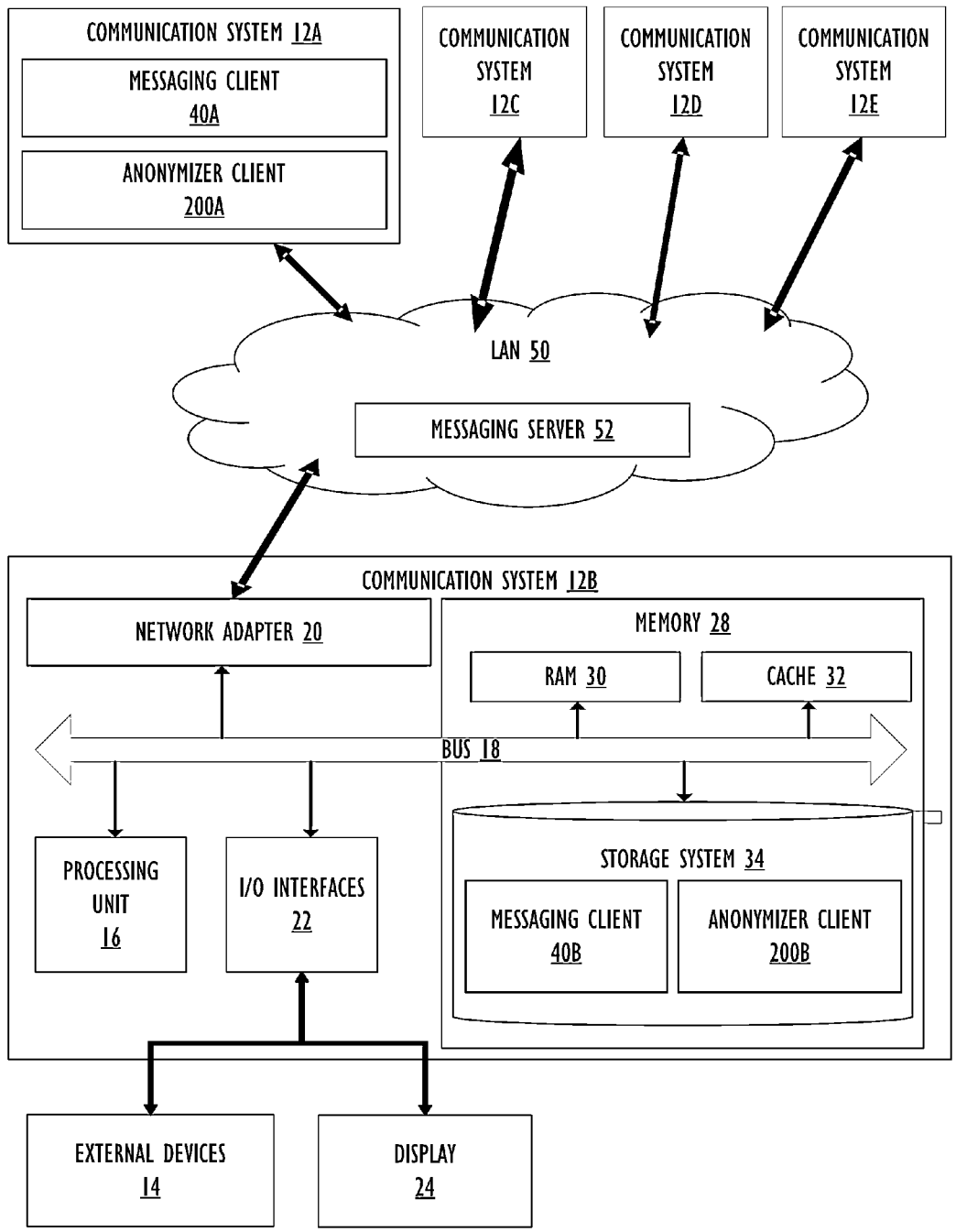
FIG. 1 illustrates a block diagram of a packet switched system according to the preferred embodiment.

At FIG. 1, there is depicted a block diagram of a packet switched system according to the preferred embodiment. The packet switched system 10 comprises a plurality of communication systems 12A-E connected over a local area network (LAN) 50 and optionally via a messaging server 52. While communication systems 12A-E are illustrated, the packet switched system may comprise any number of communication systems.

Each of communication systems 12A-E operates within other general purpose or special purpose computing system environments or configurations. Examples of well-known communication systems, environments, and/or configurations that may be suitable are, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and similar.

Communication systems 12A-E may be described in the general context of computer system-executable instructions, such as program modules, being executed by a computer system. Generally, program modules may include routines, programs, objects, components, logic, data structures, and so on, that performs particular tasks or implements particular abstract data types. As illustrated by communication system 12B, the components of each of the communication systems 12A-E may include, but are not limited to, processing unit 16 (which may comprise one or more processors or processing units), a memory 28, and a bus 18 that couples various system components, including memory 28, to processing unit 16.

Bus 18 represents one or more of any of several types of bus structures, including a memory bus or memory controller, a peripheral bus, an accelerated graphics port, and a processor or local bus using any of a variety of bus architectures. Such architectures may include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 28 includes computer system readable media in the form of volatile memory, such as random access memory (RAM) 30 and cache memory 32, and in the form of a non-volatile or persistent storage system 34. Communication systems 12A-E may further include other removable/non-removable, volatile/non-volatile computer system storage media. By way of example only, storage system 34 can be provided for reading from and writing to a non-removable, non-volatile, magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided within communication systems 12A-E. In such instances, each can be connected to bus 18 by one or more data media interfaces (not illustrated). As is further described below, memory 28 may further include at least one program product having a set of one or more program modules that configured to carry out the functions of embodiments of the present disclosure.

A set of program modules (for example messaging client 40B and anonymizer client 200B), may be stored in memory 28 as (for example) an operating system, one or more application programs, one or more other program modules, program data, or other structures known in the art. Each of the operating system, the one or more application programs, the one or more other program modules, and the program data, or some combination thereof, may include an implementation of a networking environment. Messaging client 40B and anonymizer client 200B are provided to carry out the functions and/or methodologies of embodiments of the present disclosure with respect to communication system 12B as described herein. Other corresponding program modules are provided with respect to the other communication systems 12A, 12C, 12D and 12E. Communication systems 12A-E may also communicate, via I/O interfaces 22, with a display 24 and one or more external devices 14. External devices 14 may include, but are not limited to, devices such as a keyboard, a pointing device, a display, a printer, a scanner, or any external device that enables input or output. Additionally, each of communication systems 12A-E can communicate over one or more networks such as a local area network (LAN) 50, a general wide area network (WAN), and/or a public network (e.g., the Internet) via network adapter 20. As depicted, network adapter 20 communicates with the other components of communication systems 12 via bus 18. It should be understood that, although not shown, other hardware and/or software components could be used in conjunction with communication systems 12A-E. Examples of other hardware and/or software components include, but are not limited to, microcode, device drivers, redundant processing units, external disk drive arrays, RAID systems, tape drives, and data archival storage systems.

Figure 2:
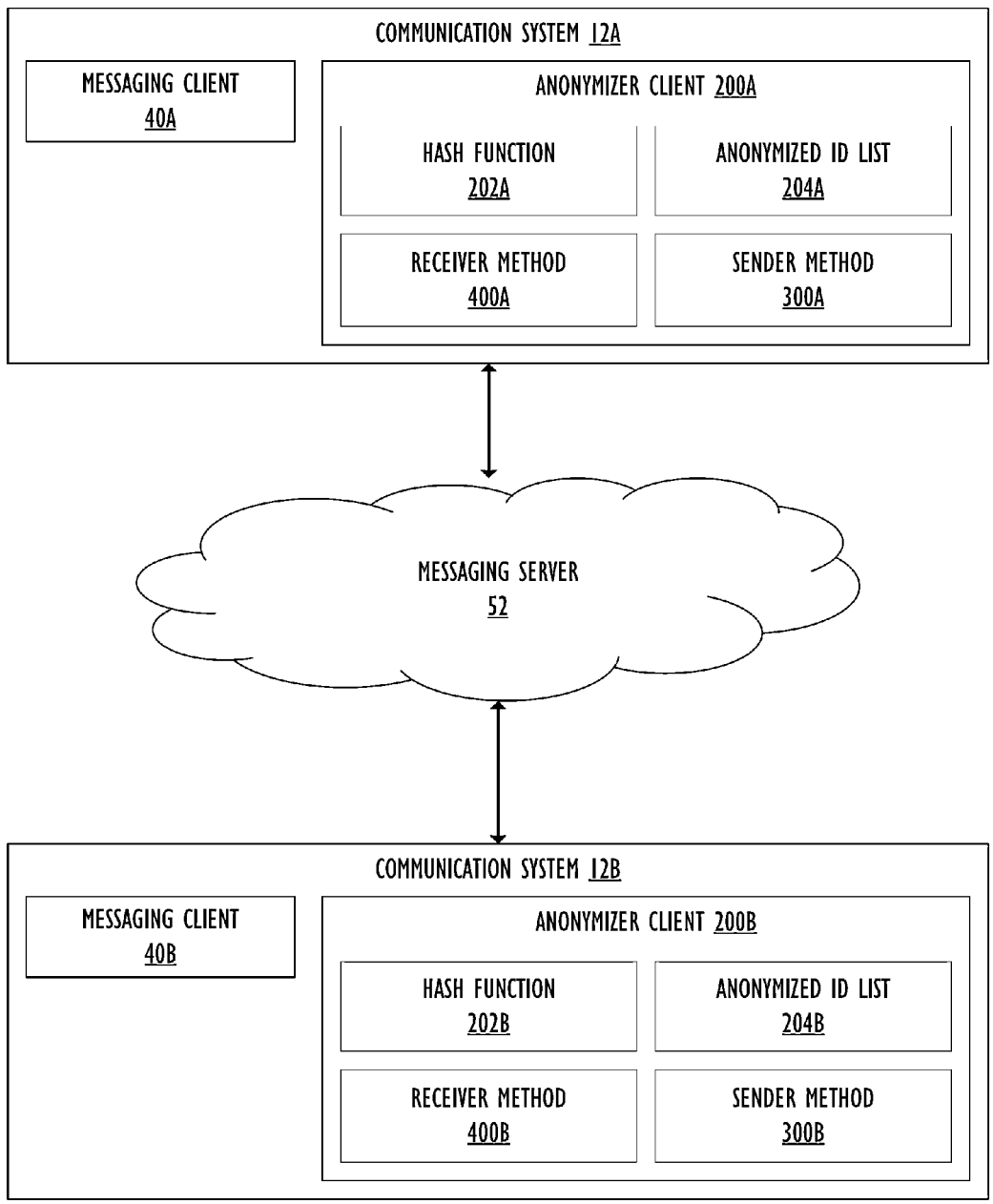
FIG. 2 illustrates a component block diagram of two anonymizer clients according to the preferred embodiment.

Referring to FIG. 2, there is depicted a block diagram of two anonymizer clients according to the preferred embodiment. Anonymizer clients 200A and 200B of communication systems 12a and 12b respectively comprise: sender methods 300A and 300B; receiver method 400A and 400B; hash function 202A and 202B; and anonymized ID list 204A and 204B. These components are described in more detail below with respect to the components in communication system 12B but apply equally to any other communication system of the embodiments.

Hash function 202B is called by sender method 300B with an identifier as input. Hash function 202B and returns an anonymized identifier associated with the input identifier. The hash function is constant over time and for all communication systems. Anonymized ID list 204B is a look up table data structure for storing associations between identifiers and anonymous identifiers. In the preferred embodiment, the anonymous identifiers stored in anonymized ID list 204B are linked to identifiers in a local address book for a respective messaging client.

Figure 3:
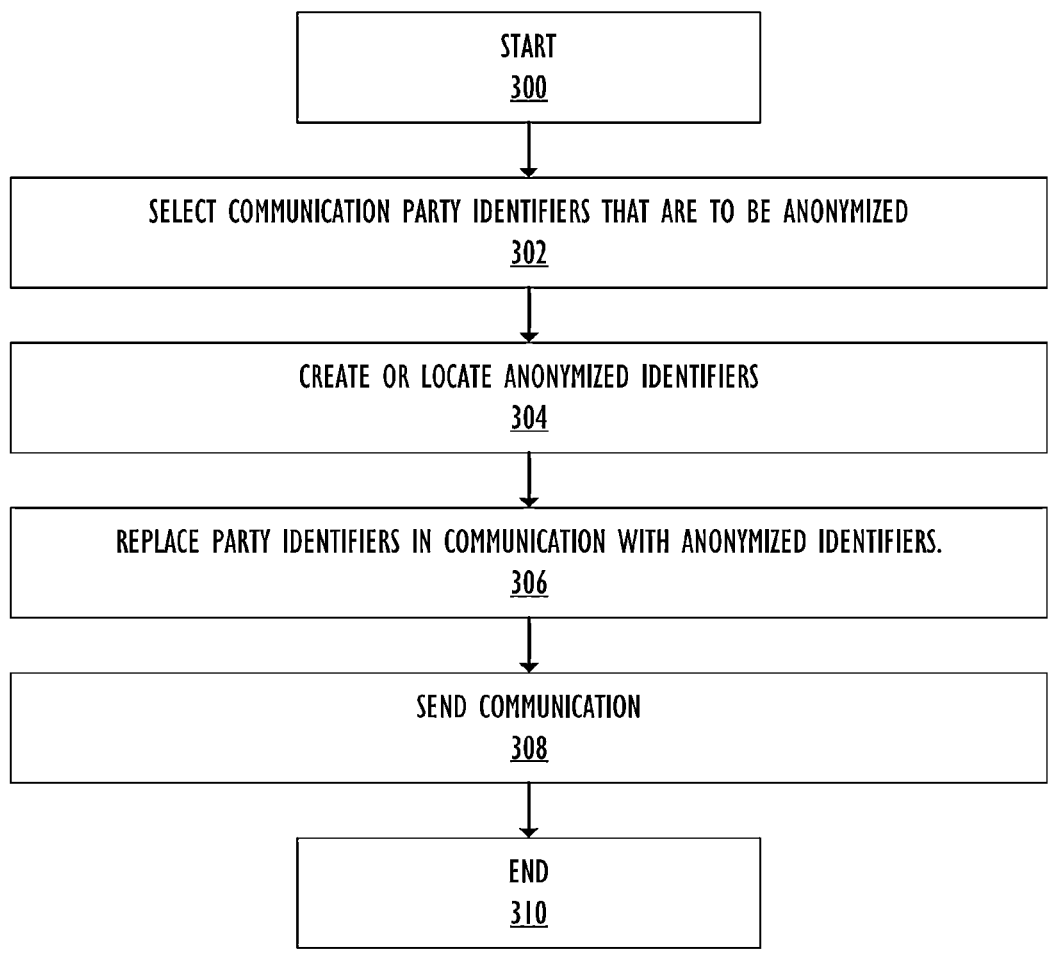
FIG. 3 illustrates flow diagram showing a sender method according to the preferred embodiment.

At FIG. 3, there is depicted a flow diagram showing a sender method according to the preferred embodiment. The sender method of the preferred embodiment comprises logical process steps 302 to 310, provided below. At step 302 is one or more communication party identifier(s) that are selected to be anonymized. At step 304 one or more corresponding anonymized identifier(s) to the communication party identifier(s) are created or located. At step 306 the one or more party identifier(s) in the communication control data are replaced with the anonymized identifier(s). Finally, the communication is sent (step 308). The process ends at step 310.

Figure 4:
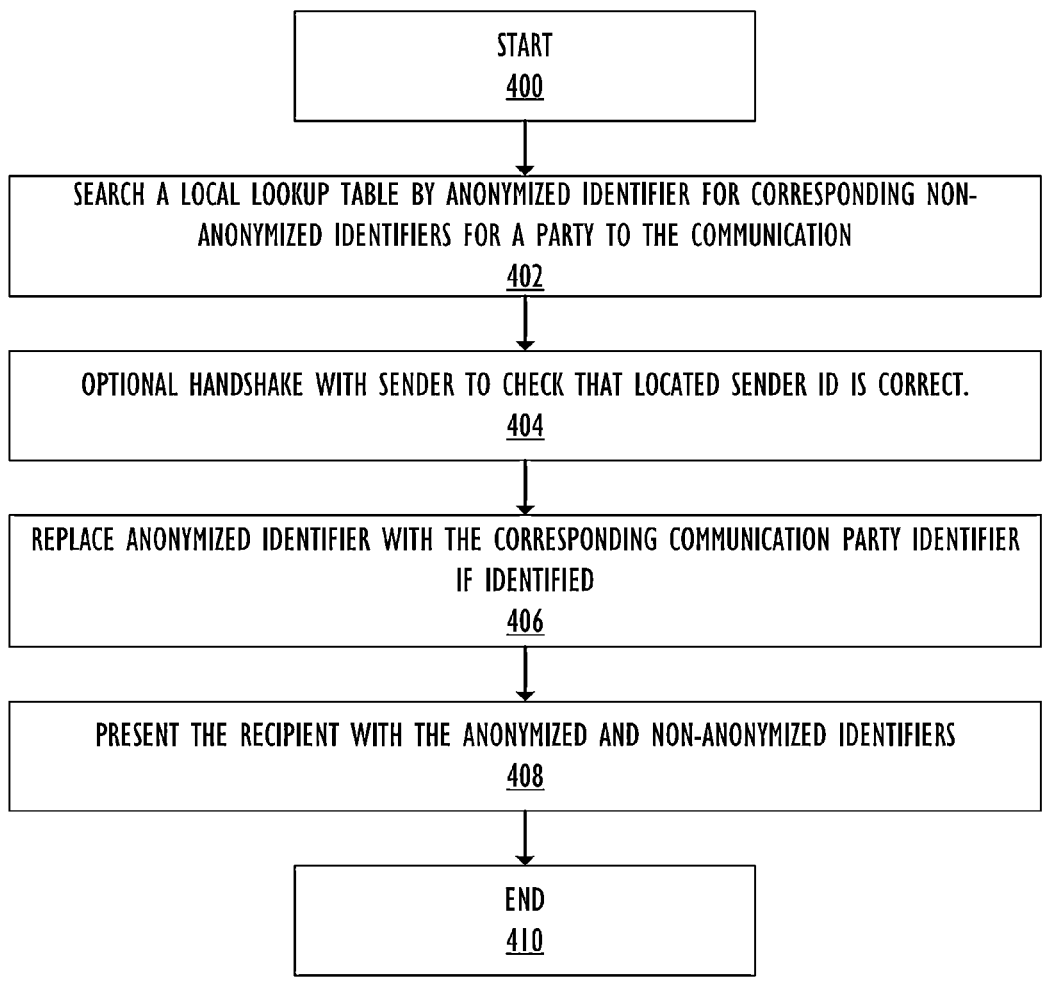
FIG. 4 illustrates a flow diagram of a receiver method according to the preferred embodiment.

At FIG. 4, there is depicted a flow diagram showing a receiver method according to the preferred embodiment. The receiver method of the present embodiment comprises logical process steps 402 to 410 performed on a received communication, as provided below. At step 402 a local lookup table is searched using an anonymized identifier for corresponding non-anonymized identifier(s) for a sender identifier that indicates party to the received communication. Next, the receiver (optionally) handshakes with the sender to confirm the located sender identifier is correct (step 404). At step 406 any anonymized identifier(s) are replaced with any identified corresponding communication party identifier(s). At step 408 is the recipient is presented with the anonymized and non-anonymized identifiers. The process then ends at step 410.

At FIG. 5, there is depicted an example graphic user interface window for a create message window according to the preferred embodiment. Create message window 500 is an example graphic user interface window displayed on a communication system that may be utilized to create a new message while choosing which parts of the new message to make anonymous. Create message window 500 comprises control buttons 502, send button 504, message data table 506, and message body 508. Send button 504 provides a selection box for initiating transmission of the composed message. Control buttons 502 provide interface control for minimizing, maximizing and closing the create message window 500.

Message body 508 is a text input field for receiving and saving an inputted message. In the example message body provided, there has been entered the text of: "This is a test message body". This input has been saved as the message body.

Message data table 506 is a text table for receiving and saving inputted message data including identifiers for the source of the message and destination recipients in addition to indications that provide whether the identifiers corresponding to the source of the message and recipients are to be anonymous. Message data table 506 further comprises address identifier column 510; anonymize column 512; FROM row 514; TO row 516; CARBON COPY (CC) row 518; and BLIND CARBON COPY (BCC) row 520.

FROM row 514 of address identifier column 510 comprises any address identifiers for the source of the message. TO row 516 of address identifier column 510 comprises any recipients of the message. CC row 518 of address identifier column 510 comprises any the carbon copy recipients of the message. Finally, BCC row 520 of address identifier column 510 comprises any blind copy recipients of the message. As illustrated in the example provided by FIG. 5, the source of the message is MrA@A.com (or A for short), the destination recipient of the message is B; the example copy recipients are C and D, and the example blind copy destination recipient is E.

Anonymize column 512 of message data table 506 contains a user interface switch that allows selection of identifiers in that same row to be made anonymous. In the preferred embodiment the switch is a binary yes/no switch which affects the whole type of identifier (e.g., all CC identifiers or all TO identifiers). In another embodiment identifiers of senders and recipients of the message are individually selected for anonymity. In still another embodiment there is a replicated set of anonymous communication fields for containing multiple identifiers for anonymizing (e.g., an anonymous TO input box, an anonymous FROM input box, and an anonymous CC input box that are all adjacent their corresponding non-anonymous identifier field). There is no input field for an anonymize BCC identifier because BCC identifiers are already not visible to recipients of the message and thus cannot be further anonymized.

Figure 6A:
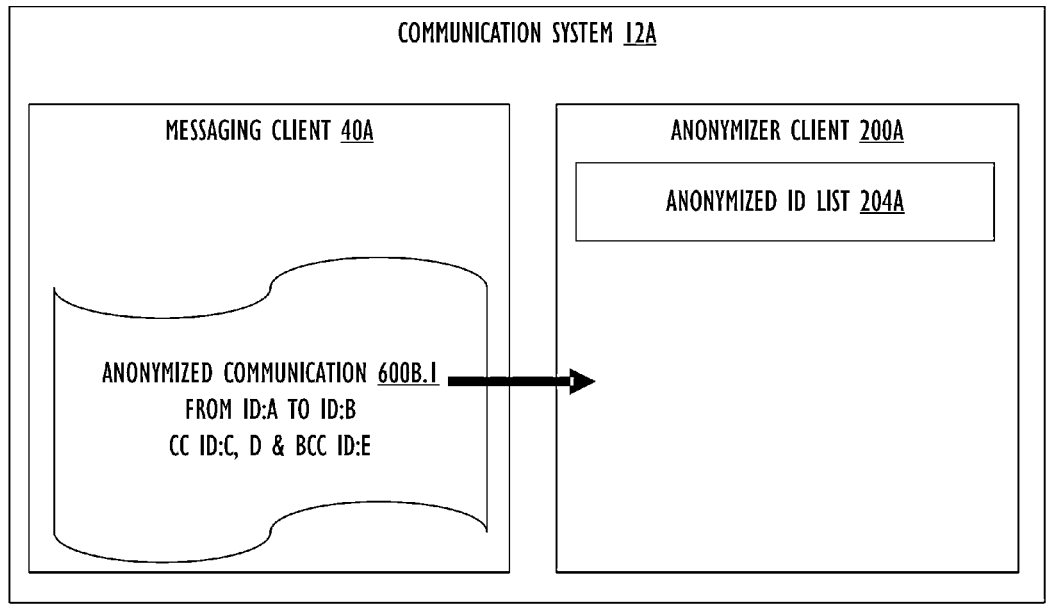
FIG. 6A-6D are block diagrams of a anonymized communication at four stages according to the preferred embodiment.
Figure 6A:
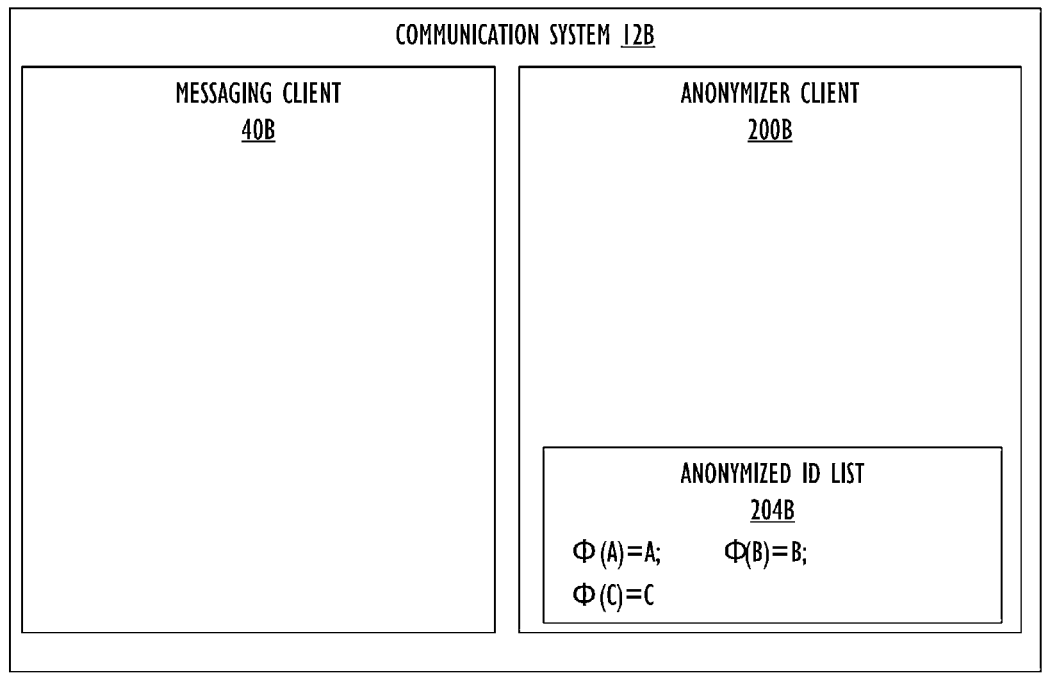

At FIG. 6A, there is depicted diagrams of an example anonymized communication at four stages according to the preferred embodiment. As illustrated, within messaging client 40A of communication system 12A there is anonymized communication 600B.1. Anonymized communication 600B.1 comprises identifiers A, B, C, D and E for sending to respective communication systems 12B, 12C, 12D and 12E and for keeping a copy for 12A. All relevant identifiers are all to be anonymized (all identifiers in each of the TO, FROM and CC fields). Anonymized communication 600B.1 is from A to B, copying C, copying D, and blind copying E. Anonymized communication 600B.1 contains message body "This is a message body" text string. Upon selection of the send button (e.g. Send 504) Message client 40A sends communication 600B.1 to anonymizer client 200A so that the send methods can be applied before sending the message to 600B.1's destinations (one of those destinations including message client 40B representing B). As illustrated, anonymizer client 200A comprises a blank anonymizer ID list 204A where anonymizer ID list 204B is already populated with identifiers A, B and C and respective anonymized identifiers Φ(A); Φ(B); and Φ(C).

Figure 6B:
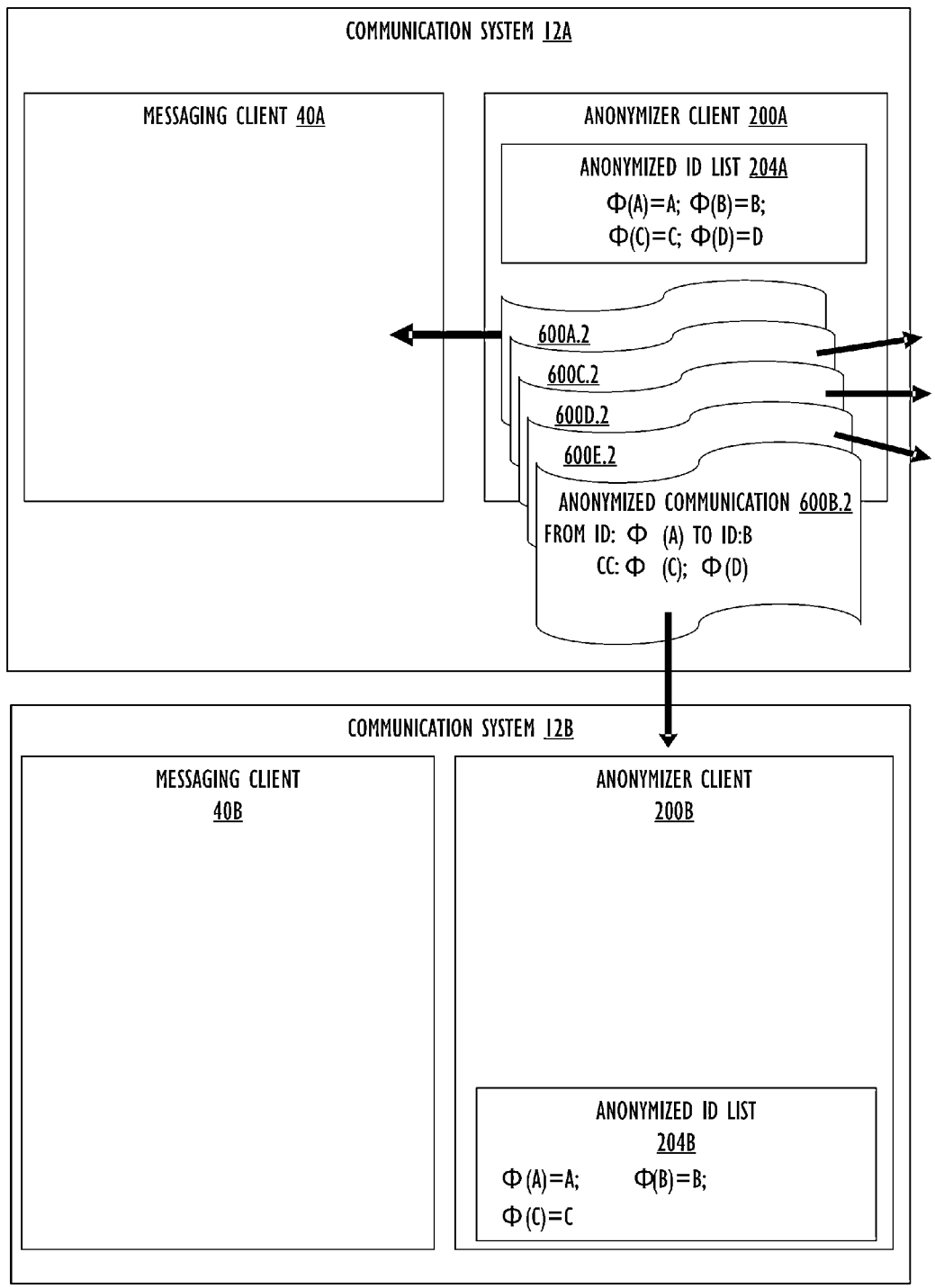

Continuing now to FIG. 6B, the requested message copies in anonymized communication 600B.1 are created and labeled according to their respective destinations (600A.2, 600B.2, 600C.2, 600D.2, and 600E.2). With respect to message 600B.2, as illustrated identifiers A, C, and D are anonymized by the sender method by replacing their identifiers in the message with their respective anonymous equivalents: Φ(A), Φ(C), and Φ(D). They are also placed in the anonymized list 204A for use in the future anonymizing or identifying. Identifier B is not anonymized because this particular copy of the message is being sent to B. Other copies of the message, 600C.2, 600D.2, and 600E.2 are sent to C, D and E, respectively, and whereby identifiers C, D and E are not anonymized in the associated copy of the message (and E is not included in any of the message copies 600A.2-600D.2).

Figure 6C:
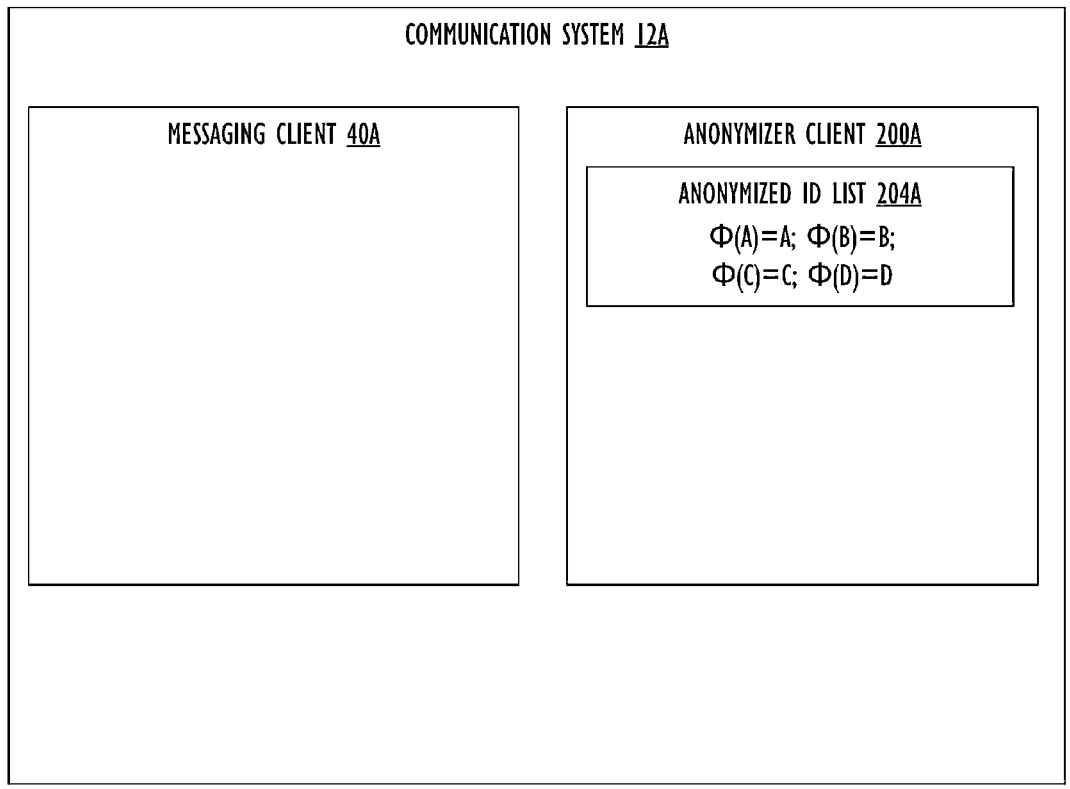
Figure 6C:
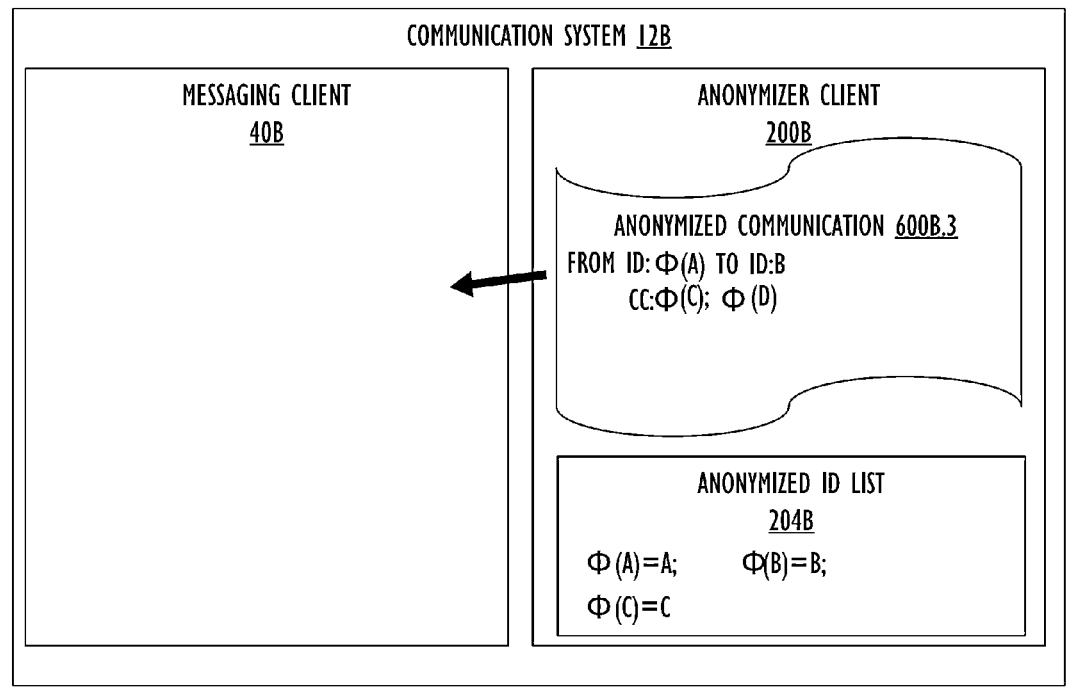

Continuing now to FIG. 6C, message 600B.3 arrives at anonymizer client 200B where the anonymized ID list 204B contains anonymous IDs for A, B and C but not D. B is not needed. The receiver method attempts to identify the parties in the message and produce a non-anonymized message for the messaging client.

Figure 6D:
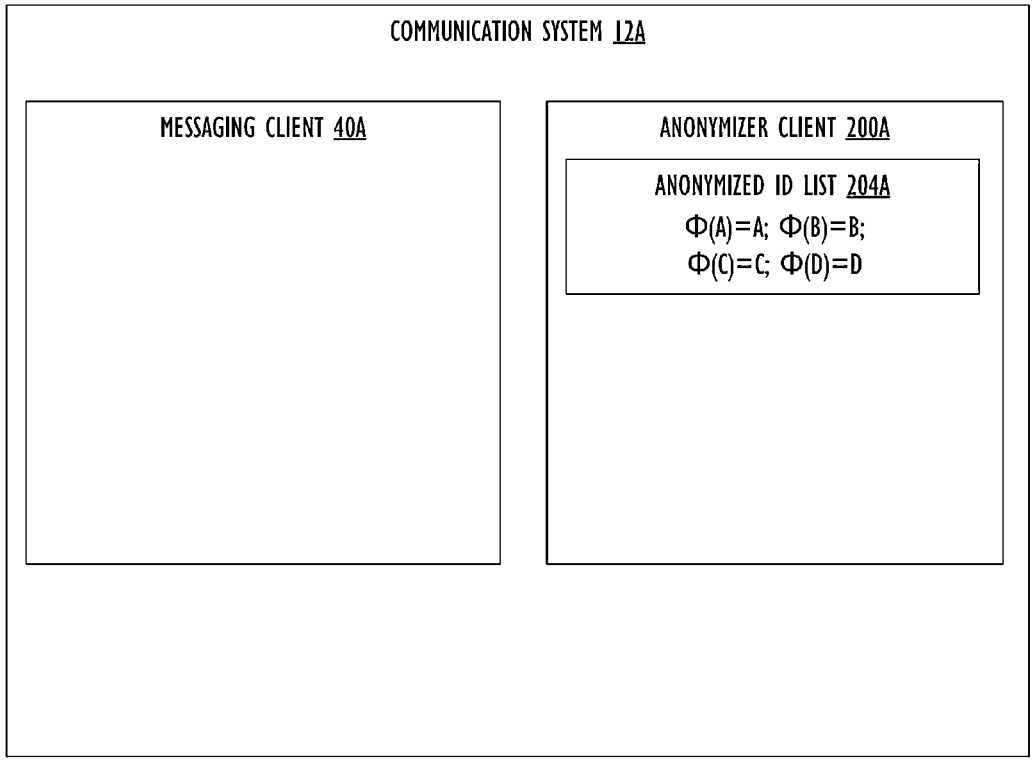
Figure 6D:
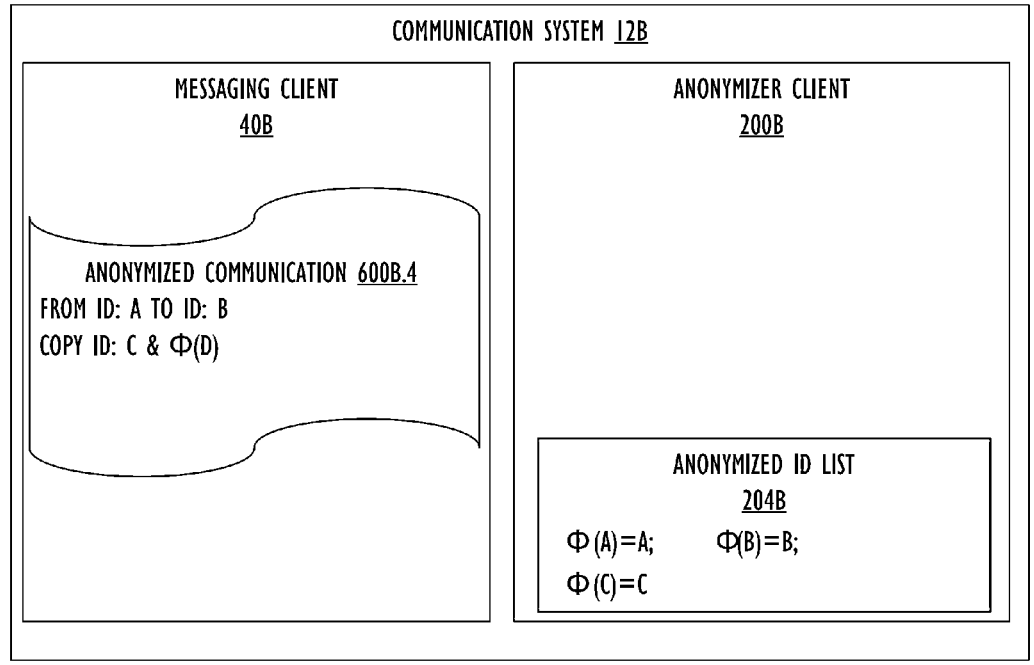

At FIG. 6D, message 600B.4 arrives at messaging client 40B containing identifiers for A, B, and C since A and C are in the anonymized list and because messaging client 40B is B. D is left anonymous as referenced by ϕ(D) because D is not in anonymized ID list 204B.

Figure 7A:
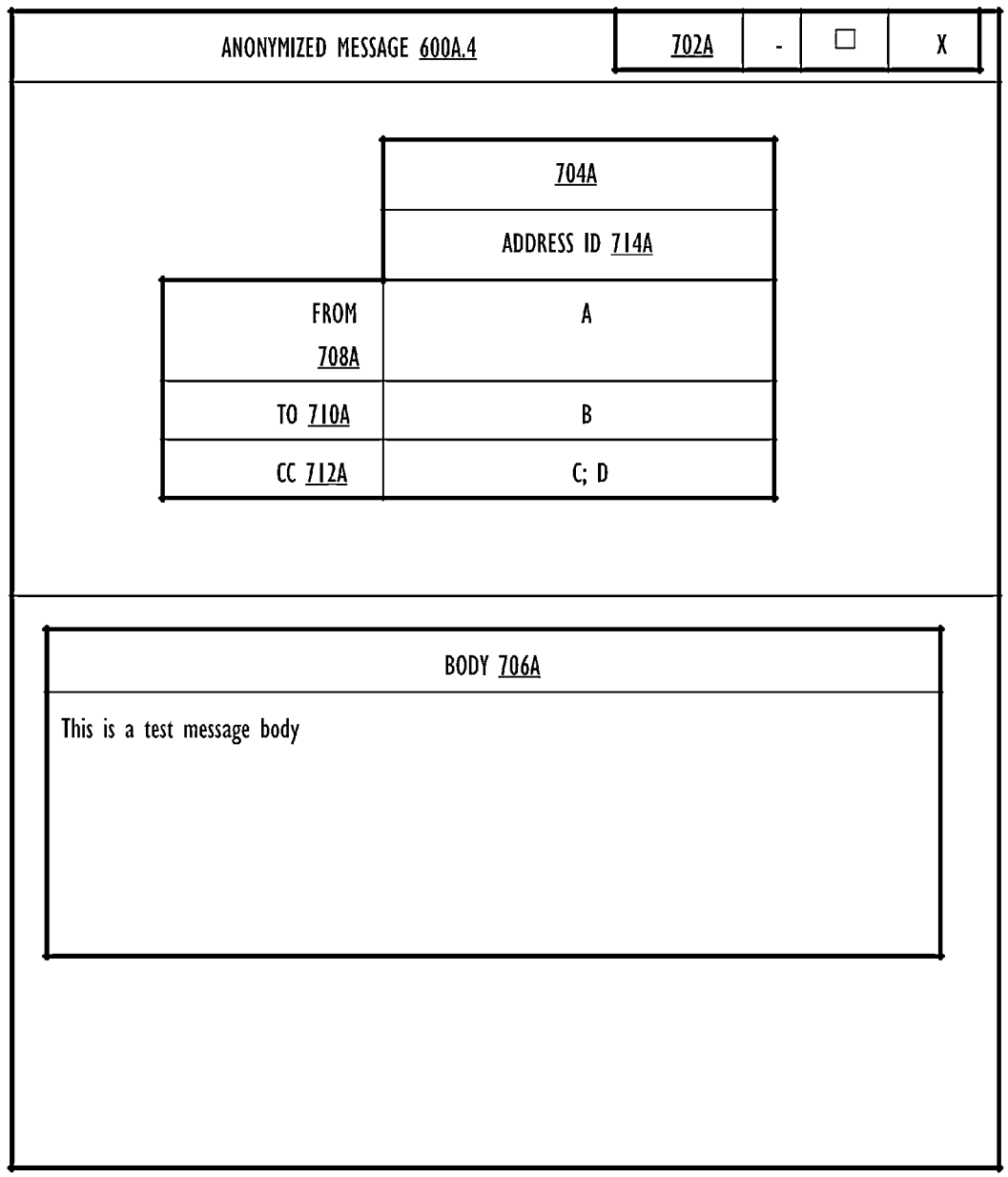
FIG. 7A-7E are block diagrams of a graphic user interface windows for each copy of the example message according to the preferred embodiment.

Referring now to FIG. 7A, there is illustrated message window 700A corresponding to anonymized message 600A.4 as stored in a send folder of communication system 12A. Message window 700A comprises control buttons 702A, communication data table 704A, and message body 706A. Message body 706A is a text display frame showing the message body "This is a test message body". Communication data table 704A presents the message data including identifiers and/or anonymized identifiers for source and destination. Message data table 704A comprises: address identifier column 714A, FROM row 708A, TO row 710A, and Carbon Copy (CC) row 712A. Address identifier columns 714A contains the address identifiers for the source of the message (FROM row 708A), the destinations/recipients of the message (TO row 710A), and the copy destinations of the message (CC row 712A). As shown, all identifiers A to D are presented as real identifiers, without anonymization, sent from A.

Figure 7B:
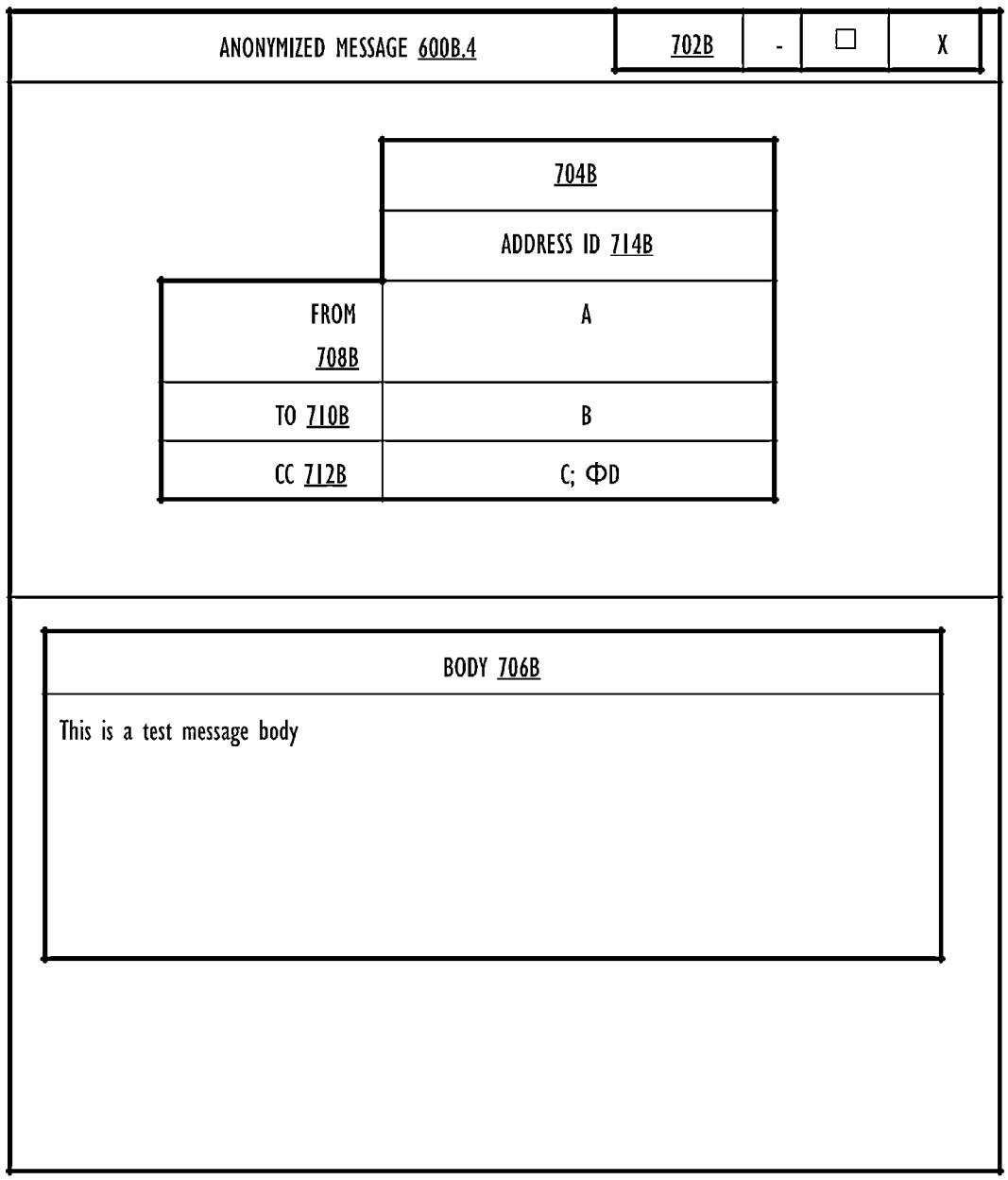

At FIG. 7B, there is illustrated message window 700B corresponding to anonymized message 600B.4, which is received in the inbox of communication system 12B. Message window 700B comprises control buttons 702B, communication data table 704B, and message body 706B. As provided in FIG. 6D, identifiers A, B and C are real identifiers and only identifier D is anonymized because D does not exist in the anonymized ID list 204B.

Figure 7C:
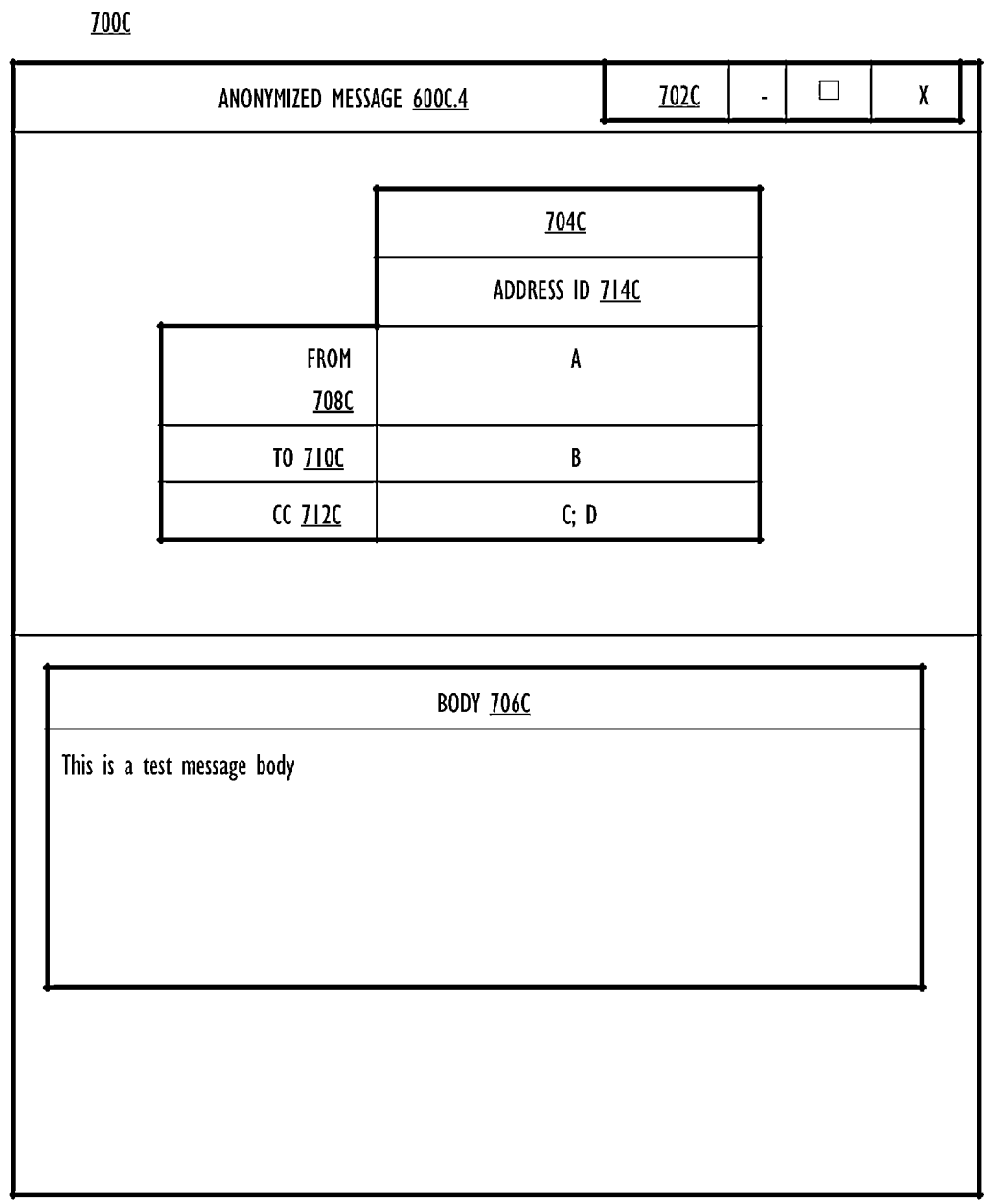

At FIG. 7C, there is illustrated message window 700C corresponding to anonymized message 600C.4, which is received in the inbox of communication system 12C. Message window 700C comprises control buttons 702C, communication data table 704C, and message body 706C. All identifiers A to D are presented as real identifiers because, for this example all identifiers already exist in an anonymized ID list 204 associated with communication system 12C.

Figure 7D:
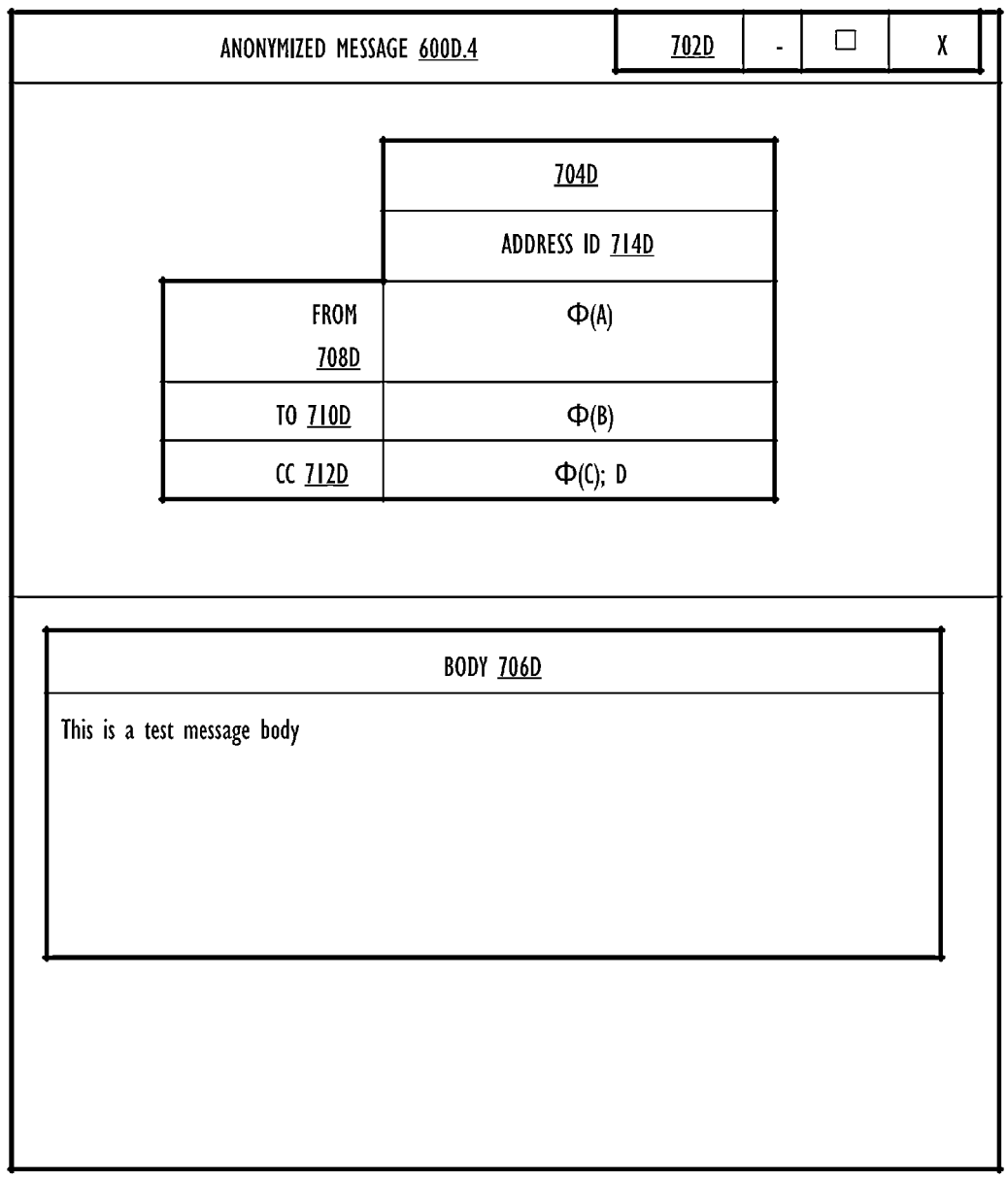

At FIG. 7D, there is illustrated message window 700D corresponding to anonymized message 600D.4 which is received in the inbox of communication system 12D. Message window 700D comprises control buttons 702D, communication data table 704D, and message body 706D. Identifiers A-C are presented as anonymized because, for this example, these identifiers do not exist in an anonymized ID list 204 associated with communication system 12D.

Figure 7E:
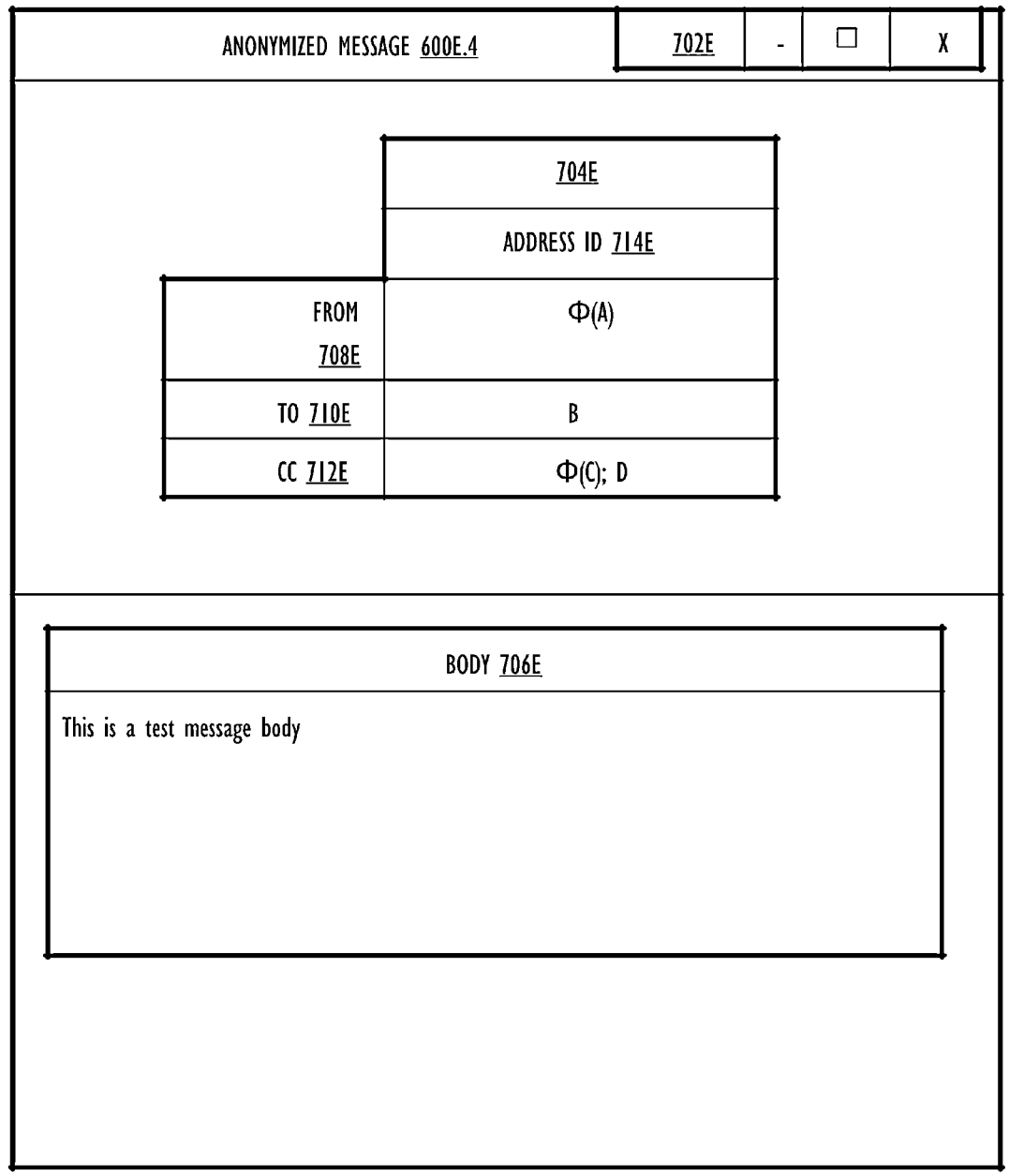

At FIG. 7E, there is illustrated message window 700E corresponding to anonymized message 600E.4 which is received in the inbox of communication system 12E. Message window 700E comprises control buttons 702E, communication data table 704E, and message body 706E. As illustrated, identifiers A and C are anonymized because they do not exist in an anonymized ID list 204 associated with communication system 12E.

It will be clear to one of ordinary skill in the art that all or part of the method of the preferred embodiment may suitably and usefully be embodied in additional logic apparatus or additional logic apparatuses, comprising logic elements arranged to perform the steps of the method and that such logic elements may comprise additional hardware components, firmware components or a combination thereof.

It will be equally clear to one of skill in the art that some or all of the functional components of the preferred embodiment may suitably be embodied in alternative logic apparatus or apparatuses comprising logic elements to perform equivalent functionality using equivalent method steps, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present disclosure may further suitably be embodied as a computer program product for use with a computer system. Such an implementation may comprise a series of computer-readable instructions either fixed on a tangible medium, such as a computer readable storage device, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present disclosure may be realized in the form of a computer implemented method of deploying a service comprising steps of deploying computer program code operable to, when deployed into a computer infrastructure and executed thereon, cause or configure the computer system to perform all the steps of the method. Computer program code for carrying out operations for aspects of the present disclosure may be written in any combination of one or more programming languages, including an object oriented programming language such as Java (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In a further alternative, the preferred embodiment of the present disclosure may be realized in the form of a data carrier having functional data thereon, said functional data comprising functional computer data structures to, when loaded into a computer system and operated upon thereby, enable said computer system to perform all the steps of the method.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present disclosure.

What is claimed is:

1. A communication receiver system, comprising:
a processor; and
a memory coupled to the processor and which includes logic that when executed on the processor enables the communication receiver system to:
receive a communication from a sender in which one or more communication party identifiers in the communication that identify at least one of a sender and one or more recipients has been replaced with one or more anonymized identifiers prior to the communication being transmitted to the one or more recipients, wherein the communication receiver system is associated with a particular recipient from among the one or more recipients;
search within a local lookup table for one or more non-anonymized identifiers corresponding to the one or more anonymized identifiers; and
in response to identifying the one or more non-anonymized identifiers:
perform, via a receiver handshake controller, a handshake with the sender to confirm that a sender identifier of the one or more non-anonymized identifiers identifies the sender;
in response to the confirming the identity of the sender, replace, via a receiver controller, the one or more anonymized identifiers in the communication with the one or more non-anonymized identifiers; and
in response to replacing the one or more anonymized identifiers in the communication with the one or more non-anonymized identifiers, present, to the particular recipient, the communication with the one or more non-anonymized identifiers.

2. The communication receiver system of claim 1, wherein the communication party identifiers comprise one or more of: an identifier of the sender and an identifier for each of the one or more recipients.

3. The communication receiver system of claim 2, wherein the sender creates, for each of the one or more recipients, a copy of the communication prior to replacing the identifier for each of the one or more recipients, and wherein a copy of the communication that is sent to each recipient uses a non-anonymized identifier corresponding to that recipient.

4. The communication receiver system of claim 3, the logic further comprising logic that enables the communication receiver system to:
provide a user interface for selecting which individual parties of the sender and the one or more recipients is to be made anonymous.

5. The communication receiver system of claim 4, wherein:
the local lookup table is included within a local address book that is associated with the particular recipient; and
the one or more non-anonymized identifiers are associated with the one or more anonymized identifiers within the local address book.

6. The communication receiver system of claim 1, wherein the communication includes a message body having a text inputted by the sender, wherein the communication party identifiers are located within at least one field of a plurality of fields of control data within the communication, wherein the plurality of fields include: a sender field, a recipient field, and a carbon copy field, and wherein the at least one field contains at least one non-anonymized identifier that has not been replaced by the sender, the at least one non-anonymized identifier corresponding to at least one of the sender and the one or more recipients, the logic further comprising program code that enables the communication receiver system to:
present the communication with the at least one non-anonymized identifier to the particular recipient.

7. The communication receiver system of claim 1, the logic further comprising program code that enables the communication receiver system to:
in response to identifying at least one anonymized identifier that does not have a corresponding non-anonymized identifier in the local lookup table, present, via the receiver presenter, the communication with the at least one anonymized identifier and the one or more non-anonymized identifiers to the particular recipient, wherein the at least one anonymized identifier is associated with at least one of the sender and at least one other recipient from among the one or more recipients.

8. The communication receiver system of claim 7, wherein the received communication contains at least one non-anonymized identifier that has not been replaced by the sender, the at least one non-anonymized identifier corresponding to at least one of the sender and the one or more recipients, and wherein the logic further comprises program code that enables the communication receiver system to:
in response to replacing the one or more anonymized identifiers in the communication with the one or more non-anonymized identifiers, present, via the receiver presenter, the communication with the at least one anonymized identifier, the at least one non-anonymized identifier, and the one or more non-anonymized identifiers.

9. The communication receiver system of claim 1, wherein the sender and the communication receiver system share a hash function, that is applied by the sender to the one or more communication party identifiers to create the one or more anonymized identifiers prior to transmitting the communication, and wherein anonymous identifiers created by the hash function are linked to identifiers in a local address book of a messaging client.

10. The communication receiver system of claim 1, wherein:
each recipient of the one or more recipients is associated with a separate communication receiver system; and
each communication receiver system includes a separate local lookup table.

11. A computer program product comprising:
a non-transitory computer readable storage device; and
program code on the non-transitory computer readable storage device that that when executed by a processor within a data processing system, causes the data processing system to perform the functions of:
receiving, at a communication receiver system associated with a particular recipient of one or more recipients, a communication from a sender, wherein the sender has replaced, prior to transmitting the communication to the one or more recipients, one or more communication party identifiers in the communication that identify at least one of the sender and the one or more recipients with one or more anonymized identifiers;
searching within a local lookup table for one or more non-anonymized identifiers corresponding to the anonymized identifiers; and
in response to identifying the one or more non-anonymized identifiers:

performing a handshake with the sender to confirm that a sender identifier of the one or more non-anonymized identifiers identifies the sender;

in response to the confirming the identity of the sender, replacing the one or more anonymized identifiers in the communication with the one or more non-anonymized identifiers; and in response to replacing the one or more anonymized identifiers in the communication with the one or more non-anonymized identifiers, presenting the communication with the one or more non-anonymized identifiers to the particular recipient.

12. The computer program product of claim 11, wherein the communication party identifiers comprise one or more of: an identifier of the sender and an identifier for each of the one or more recipients.

13. The computer program product of claim 12, wherein the sender creates, for each of the one or more recipients, a copy of the communication prior to replacing the identifier for each of the one or more recipients, and wherein a copy of the communication that is sent to each recipient uses a non-anonymized identifier corresponding to that recipient.

14. The computer program product of claim 13, further comprising program code for:

providing a user interface for selecting which individual parties of the sender and the one or more recipients is to be made anonymous.

15. The computer program product of claim 14, wherein:
the local lookup table is included within a local address book that is associated with the particular recipient; and
the one or more non-anonymized identifiers are associated with the one or more anonymized identifiers within the local address book.

16. The computer program product of claim 11, wherein the communication includes a message body having a text inputted by the sender, wherein the communication party identifiers are located within at least one field of a plurality of fields of control data within the communication, wherein the plurality of fields include: a sender field, a recipient field, and a carbon copy field, wherein the at least one field contains at least one non-anonymized identifier that has not been replaced by the sender, the at least one non-anonymized identifier corresponding to at least one of the sender and the one or more recipients, and wherein the program code further comprises program code that causes the data processing system to perform the functions of:

presenting the communication with the at least one non-anonymized identifier to the particular recipient.

17. The computer program product of claim 11, the program code further comprising program code that causes the data processing system to perform the function of:

in response to identifying at least one anonymized identifier that does not have a corresponding non-anonymized identifier in the local lookup table, presenting the communication with the at least one anonymized identifier and the one or more non-anonymized identifiers to the particular recipient.

18. The computer program product of claim 17, wherein the received communication contains at least one non-anonymized identifier that has not been replaced by the sender, the at least one non-anonymized identifier corresponding to at least one of the sender and the one or more recipients, and wherein the program code further comprises program code that causes the data processing system to perform the functions of:

in response to replacing the one or more anonymized identifiers in the communication with the one or more non-anonymized identifiers, presenting the communication with the at least one anonymized identifier, the at least one non-anonymized identifier, and the one or more non-anonymized identifiers.

19. The computer program product of claim 11, wherein the sender and the communication receiver system share a hash function, that is applied by the sender to the one or more communication party identifiers to create the one or more anonymized identifiers prior to transmitting the communication, and wherein anonymous identifiers created by the hash function are linked to identifiers in a local address book of a messaging client.

20. The computer program product of claim 11, wherein:
each recipient of the one or more recipients is associated with a separate communication receiver system; and
each communication receiver system includes a separate local lookup table.

* * * * *